(12) United States Patent
Rong et al.

(10) Patent No.: US 10,419,161 B2
(45) Date of Patent: Sep. 17, 2019

(54) METHOD AND COMMUNICATIONS DEVICE FOR TRANSMITTING INFORMATION

(71) Applicant: HUAWEI TECHNOLOGIES CO., LTD., Shenzhen, Guangdong (CN)

(72) Inventors: Lu Rong, Shanghai (CN); Guangzhu Zeng, Hangzhou (CN); Yong Xie, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 142 days.

(21) Appl. No.: 15/699,192

(22) Filed: Sep. 8, 2017

(65) Prior Publication Data

US 2018/0013517 A1 Jan. 11, 2018

Related U.S. Application Data

(63) Continuation of application No. PCT/CN2015/073921, filed on Mar. 10, 2015.

(51) Int. Cl.
*H04L 1/00* (2006.01)

(52) U.S. Cl.
CPC .......... *H04L 1/0058* (2013.01); *H04L 1/0008* (2013.01); *H04L 1/0041* (2013.01); *H04L 1/0057* (2013.01); *H04L 1/0067* (2013.01)

(58) Field of Classification Search
CPC ... H04L 1/0058; H04L 1/0008; H04L 1/0041; H04L 1/0057; H04L 1/006
See application file for complete search history.

(56) References Cited

U.S. PATENT DOCUMENTS 6,272,137 B1   8/2001   Noiri
8,320,301 B2   11/2012  Walton et al.
(Continued)

FOREIGN PATENT DOCUMENTS

CN   102164025 A   8/2011
CN   103023618 A   4/2013
(Continued)

OTHER PUBLICATIONS

Extended European Search Report dated Feb. 6, 2018, in corresponding European Patent Application No. 15884227.8, 9 pgs.
(Continued)

*Primary Examiner* — Kyle Vallecillo
(74) *Attorney, Agent, or Firm* — Staas & Halsey LLP

(57) ABSTRACT

The invention provides a method and a communications device for transmitting information. The method includes: determining a quantity N of padding bits according to a quantity M of effective information bits included in a code block and a quantity L of effective input ports of a polar code encoder, where M and L are positive integers, and N is a difference between L and M; determining input bits that are to be input into the polar code encoder, where the input bits include the M effective information bits and the N padding bits; inputting, according to a mapping relationship between the L effective input ports and the input bits, the input bits into the polar code encoder through the L effective input ports to perform coding, so as to obtain coded bits; and transmitting the coded bits. This bit-padding manner has ensured successful information transmission.

18 Claims, 7 Drawing Sheets

(56) References Cited

U.S. PATENT DOCUMENTS

| | | | |
|---|---|---|---|
| 8,379,622 B2 | 2/2013 | McBeath et al. | |
| 9,467,164 B2* | 10/2016 | Ionita | H04L 25/4917 |
| 2004/0082356 A1 | 4/2004 | Walton et al. | |
| 2008/0310352 A1 | 12/2008 | McBeath et al. | |
| 2013/0283128 A1 | 10/2013 | Lee et al. | |
| 2015/0091742 A1* | 4/2015 | Ionita | H03M 5/18 341/57 |
| 2015/0194987 A1 | 7/2015 | Li et al. | |
| 2015/0249473 A1* | 9/2015 | Li | H03M 13/13 341/51 |
| 2016/0013887 A1 | 1/2016 | Shen et al. | |
| 2016/0218743 A1 | 7/2016 | Li et al. | |

FOREIGN PATENT DOCUMENTS

| | | | |
|---|---|---|---|
| CN | 103825669 A | 5/2014 | |
| CN | 104079370 A | 10/2014 | |
| CN | 104079382 A | 10/2014 | |
| JP | 2013225307 A | 10/2013 | |
| RU | 2485699 C2 | 6/2013 | |
| RU | 2491732 C2 | 8/2013 | |
| WO | 2014044072 A1 | 3/2014 | |
| WO | 2014/075419 A1 | 5/2014 | |
| WO | 2015006947 A1 | 1/2015 | |

OTHER PUBLICATIONS

International Search Report dated Aug. 5, 2015 in corresponding International Application No. PCT/CN2015/073921, 4 pp.
Notice of Allowance dated Jan. 22, 2019 in related Russian Patent Application No. 2018103888 (24 pages).
International Search Report dated Aug. 5, 2016 in corresponding International Patent Application No. PCT/CN2015/073921.
Search Report, dated Jan. 23, 2019, in Chinese Application No. 201810787115.8 (2 pp).
Office Action, dated Jan. 31, 2019, in Chinese Application No. 201810787115.8 (4 pp.).
Notice of Reasons for Rejection, dated Sep. 3, 2018, in Japanese Application No. 2017547533 (10 pp.).
Search Report, dated Apr. 25, 2019, in Chinese Application No. 201580075130.4 (2 pp.).
Office Action, dated May 7, 2019, in Chinese Application No. 201580075130.4 (6 pp.).

* cited by examiner

1000

Determine a quantity N of padding bits according to a quantity M of effective information bits included in a code block and a quantity L of effective input ports of a polar code encoder, where M and L are positive integers, and N is a difference between L and M — S1100

Determine input bits that are to be input into the polar code encoder, where the input bits include the M effective information bits and the N padding bits — S1200

Input, according to a mapping relationship between the L effective input ports and the input bits and, the input bits into the polar code encoder through the L effective input ports to perform coding, so as to obtain coded bits after the coding — S1300

Transmit the coded bits — S1400

FIG. 4

METHOD AND COMMUNICATIONS DEVICE FOR TRANSMITTING INFORMATION

CROSS-REFERENCE TO RELATED APPLICATION

This application is a continuation of International Application No. PCT/CN2015/073921, filed on Mar. 10, 2015, the disclosure of which is hereby incorporated by reference in its entirety.

TECHNICAL FIELD

The present invention relates to the communications field, and more specifically, to a method and a communications device for transmitting information.

BACKGROUND

Polar code is a coding technology that draws increasing attention in recent years. The polar code constructs a compound channel and changes a feature of an original channel, so that a capacity of the compound channel is much closer to a high or low pole. Therefore, this coding technology is referred to as "polar code". Because of this feature, with an appropriate coding design, the polar code is applicable to a randomly distributed original channel, and reach good performance and approach a channel capacity in various channel implementations. In addition, by means of interference cancellation decoding, the polar code can greatly reduce receiver complexity and facilitate receiver implementation.

An existing polar code encoder usually uses a fixed coding structure, a fixed quantity of effective input bits, and a fixed quantity of effective output bits. In theory, once a structure of a polar code encoder is determined, a quantity of input bits (or a length of input bits) of the polar code encoder is determined. However, because each input port of the polar code encoder corresponds to a different compound channel condition and it is inappropriate to use a port in a poor condition to transmit effective data, input bits of the polar code encoder are further classified into effective data bits and frozen bits. The frozen bits correspond to an input port that is of a compound channel and that is in a poor condition, and are fixed bits known to a receive end, for example, all zeroes, and may serve as prior information to help the receiver in decoding.

To use a hardware accelerator in implementation, the polar code encoder usually implements the frozen bits by using an internal structure, and external input of the polar code encoder is effective input bits of a fixed length. In an actual application, a size of a data block that needs to be transmitted is unfixed, and is usually unequal to a quantity of effective input bits of the polar code encoder. When a data block is relatively large, segmented coding may be performed. However, when a quantity of effective information bits of a code block is less than a quantity of effective input ports of the polar code encoder, coding cannot be performed by using the polar code. As a result, the code block cannot be transmitted by using the polar code.

SUMMARY

The present invention provides a method and a communications device for transmitting information. With the provided method and the communications device, when a quantity of effective information bits included in a to-be-transmitted code block is less than a quantity of effective input ports of a polar code encoder, coding can be successfully implemented by using polar code, thereby completing transmission of the effective information bits.

According to a first aspect, a method for transmitting information is provided, and includes: determining a quantity N of padding bits according to a quantity M of effective information bits included in a code block and a quantity L of effective input ports of a polar code encoder, where M and L are positive integers, and N is a difference between L and M; determining input bits that are to be input into the polar code encoder, where the input bits include the M effective information bits and the N padding bits; inputting, according to a mapping relationship between the L effective input ports and the input bits, the input bits into the polar code encoder through the L effective input ports to perform coding, so as to obtain coded bits; and transmitting the coded bits.

With reference to the first aspect, in a first possible implementation manner of the first aspect, the mapping relationship is determined according to a rule that quality of compound channels corresponding to effective input ports that are used to transmit the M effective information bits is better than quality of compound channels corresponding to effective input ports that are used to transmit the N padding bits.

With reference to the first aspect or the first possible implementation manner of the first aspect, in a second possible implementation manner of the first aspect, the mapping relationship is that a first group of effective input ports are used to transmit the M effective information bits and a second group of effective input ports are used to transmit the N padding bits; and the first group of effective input ports and the second group of effective input ports are determined according to quality of a compound channel corresponding to an effective input port in the L effective input ports, and quality of a compound channel corresponding to an effective input port in the first group of effective input ports is better than quality of a compound channel corresponding to an effective input port in the second group of effective input ports.

With reference to the first aspect or the first possible implementation manner of the first aspect, in a third possible implementation manner of the first aspect, the mapping relationship is determined according to a result of sorting the L effective input ports according to quality of corresponding compound channels.

With reference to the third possible implementation manner of the first aspect, in a fourth possible implementation manner of the first aspect, the mapping relationship is that M effective input ports whose compound channels have best quality in an effective input port sequence are used to transmit the M effective information bits in the input bits, where the effective input port sequence is generated by sorting the L effective input ports according to the quality of the corresponding compound channels.

With reference to any one of the first to the fourth possible implementation manners of the first aspect, in a fifth possible implementation manner of the first aspect, the quality of the compound channel corresponding to an effective input port in the L effective input ports is represented by at least one of the following parameters: a channel capacity, channel confidence, a bit error rate, and a block error rate.

According to a second aspect, a communications device for transmitting information is provided, and includes: a determining module, configured to determine a quantity N of padding bits according to a quantity M of effective information bits included in a code block and a quantity L of effective input ports of a polar code encoder, where M and L are positive integers, and N is a difference between L and M; where the determining module is further configured to determine input bits that are to be input into the polar code encoder, where the input bits include the M effective information bits and the N padding bits; and an information sending module, configured to: input, according to a mapping relationship between the L effective input ports and the input bits, the input bits into the polar code encoder through the L effective input ports to perform coding, so as to obtain coded bits; and transmit the coded bits.

With reference to the second aspect, in a first possible implementation manner of the second aspect, the mapping relaitionship is determined according to a rule that quality of compound channels corresponding to effective input ports that are used to transmit the M effective information bits is better than quality of compound channels corresponding to effective input ports that are used to transmit the N padding bits.

With reference to the second aspect or the first possible implementation manner of the second aspect, in a second possible implementation manner of the second aspect, the mapping relationship is that a first group of effective input ports are used to transmit the M effective information bits and a second group of effective input ports are used to transmit the N padding bits; and the first group of effective input ports and the second group of effective input ports are determined according to quality of a compound channel corresponding to an effective input port in the L effective input ports, and quality of a compound channel corresponding to an effective input port in the first group of effective input ports is better than quality of a compound channel corresponding to an effective input port in the second group of effective input ports.

With reference to the second aspect or the first possible implementation manner of the second aspect, in a third possible implementation manner of the second aspect, the mapping relationship is determined according to a result of sorting the L effective input ports according to quality of corresponding compound channels.

With reference to the third possible implementation manner of the second aspect, in a fourth possible implementation manner of the second aspect, the mapping relationship is that M effective input ports whose compound channels have best quality in an effective input port sequence are used to transmit the M effective information bits in the input bits, where the effective input port sequence is generated by sorting the L effective input ports according to the quality of the corresponding compound channels.

With reference to any one of the first to the fourth possible implementation manners of the second aspect, in a fifth possible implementation manner of the second aspect, the quality of the compound channel corresponding to an effective input port in the L effective input ports is represented by at least one of the following parameters: a channel capacity, channel confidence, a bit error rate, and a block error rate.

Based on the foregoing technical features, according to the method and the communications device for transmitting information provided in embodiments of the present invention, a quantity N of padding bits is determined according to a quantity M of effective information bits included in a code block and a quantity L of effective input ports of a polar code encoder; input bits include the M effective information bits and the N padding bits; according to the mapping relationship between the effective input ports and the input bits, the input bits are input into the polar code encoder to perform coding, so as to obtain the coded bits; and the coded bits are transmitted. In this way, when the quantity of the effective information bits included in the code block is less than the quantity of the effective input ports of the polar code encoder, coding is successfully performed in a bit-padding manner by using polar code, thereby completing transmission of the effective information bits.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 4 is a schematic flowchart of a method for transmitting information according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that technical solutions of the present invention may be applied to an aspect of information transmission between a base station and user equipment (UE), or may be applied to an aspect of information transmission between sites (an access point is a special site) in a wireless local area network (WLAN).

The base station may be a base transceiver station (BTS) in GSM or CDMA, may be a NodeB (NB) in WCDMA, or may be an evolved NodeB (ENB or e-NodeB) in LTE, a relay node, an access point, a base station device in a future 5G network, or the like. The present invention is not limited thereto.

The user equipment may be referred to as terminal equipment (TE), a mobile station (MS), a mobile terminal (MT), and the like. The user equipment may communicate with one or more core networks through a radio access network (RAN). For example, the user equipment may be a mobile phone (also referred to as a "cellular" phone) or a computer with a mobile terminal. For example, the user equipment may be a portable, pocket-sized, handheld, computer built-in, or in-vehicle mobile apparatus, which exchanges voice and/or data with the radio access network.

Figure 1:
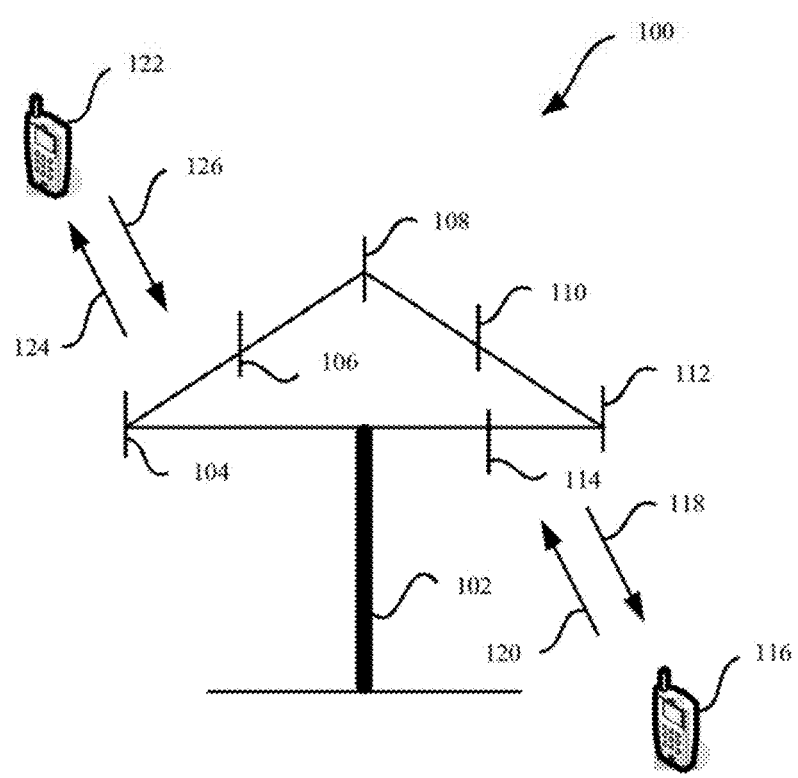
FIG. 1 shows a wireless communications system according to embodiments described in this specification.

FIG. 1 shows a wireless communications system 100 according to the embodiments described in this specification. The system 100 includes a base station 102, and the base station 102 may include multiple antenna groups. For example, one antenna group may include antennas 104 and 106, another antenna group may include antennas 108 and 110, and an additional group may include antennas 112 and 114. Two antennas are illustrated in each antenna group; however, more or less antennas may be used in each group. The base station 102 may additionally include a transmitter chain and a receiver chain. A person of ordinary skill in the art may understand that both the transmitter chain and the receiver chain may include a plurality of components (for example, a processor, a modulator, multiplexer, a demodulator, a demultiplexer, and an antenna) related to signal sending and receiving.

The base station 102 may communicate with one or more access terminals (for example, an access terminal 116 and an access terminal 122). However, it may be understood that the base station 102 may communicate with basically any quantity of access terminals similar to the access terminals 116 and 122. For example, the access terminals 116 and 122 may be cellular phones, smart phones, portable computers, handheld communications devices, handheld computing devices, satellite radio apparatuses, the Global Positioning System, PDAs, and/or any other suitable devices configured to communicate in the wireless communications system 100. As shown in the figure, the access terminal 116 communicates with the antennas 112 and 114. The antennas 112 and 114 send information to the access terminal 116 by using a forward link 118 and receive information from the access terminal 116 by using a reverse link 120. In addition, the access terminal 122 communicates with the antennas 104 and 106. The antennas 104 and 106 send information to the access terminal 122 by using a forward link 124 and receive information from the access terminal 122 by using a reverse link 126. For example, in a frequency division duplex (FDD) system, the forward link 118 may use a frequency band different from that used by the reverse link 120, and the forward link 124 may use a frequency band different from that used by the reverse link 126. In addition, in a time division duplex (TDD) system, the forward link 118 and the reverse link 120 may use a same frequency band, and the forward link 124 and the reverse link 126 may use a same frequency band.

Each antenna group and/or each area designed for communication are/is referred to as sectors or a sector of the base station 102. For example, the antenna group may be designed to communicate with an access terminal in a sector in a coverage area of the base station 102. In communication performed by using the forward links 118 and 124, a transmit antenna of the base station 102 may improve, by means of beamforming, signal-to-noise ratios of the forward links 118 and 124 that are respectively specific to the access terminals 116 and 122. In addition, compared with that a base station sends, by using a single antenna, information to all access terminals served by the base station, when the base station 102 sends, by means of beamforming, information to the access terminals 116 and 122 that are randomly scattered in the related coverage area, less interference is caused to a mobile device in a neighboring cell.

At given time, the base station 102, the access terminal 116 and/or the access terminal 122 may be wireless communications sending apparatuses and/or wireless communications receiving apparatuses. When sending data, the wireless communications sending apparatus can code the data for transmission. Specifically, the wireless communications sending apparatus may have (for example, generate, obtain, or save in a memory) a specific quantity of information bits that need to be sent to the wireless communications receiving apparatus by using a channel. The information bits may be included in a transport block (or multiple transport blocks) of data, and the information bits may be segmented to generate multiple code blocks. In addition, the wireless communications sending apparatus may code each code block by using a polar code encoder (not shown), so as to improve reliability of data transmission, thereby further ensuring communication quality.

Figure 2:
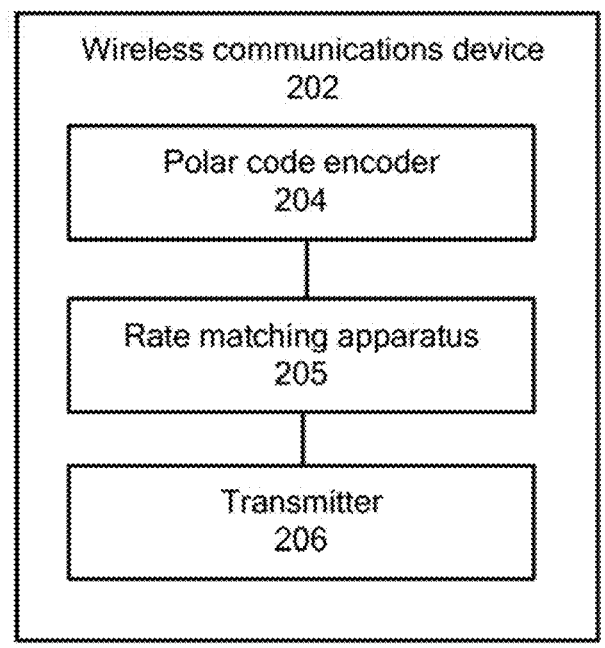
FIG. 2 shows a schematic block diagram of a system applicable to a method for transmitting information of the present invention in a wireless communication environment.

FIG. 2 shows a schematic block diagram of a system 200 applicable to a method for transmitting information of the present invention in a wireless communication environment. The system 200 includes a wireless communications device 202, and it is shown that the wireless communications device 202 sends data through a channel. Although only data sending is shown, the wireless communications device 202 may further receive data through the channel (for example, the wireless communications device 202 may send and receive data simultaneously, the wireless communications device 202 may send and receive data at different moments, or a combination thereof is used). For example, the wireless communications device 202 may be a base station (for example, the base station 102 shown in FIG. 1), an access terminal (for example, the access terminal 116 shown in FIG. 1, or the access terminal 122 shown in FIG. 1), or the like.

The wireless communications device 202 may include a polar code encoder 204, a rate matching apparatus 205, and a transmitter 206. Optionally, when the wireless communications device 202 receives data through the channel, the wireless communications device 202 may further include a receiver, and the receiver may exist independently or may be integrated with the transmitter 206 to form a transceiver.

The polar code encoder 204 is configured to code data that needs to be transferred from the wireless communications device 202, so as to obtain polar code after the coding.

In this embodiment of the present invention, the polar code encoder 204 is configured to receive input bits by using effective input ports and code the input bits to obtain coded bits.

In addition, the transmitter 206 may subsequently transfer, on a channel, rate-matched output bits processed by the rate matching apparatus 205. For example, the transmitter 206 may send related data to another different wireless communications apparatus (not shown).

Figure 3:
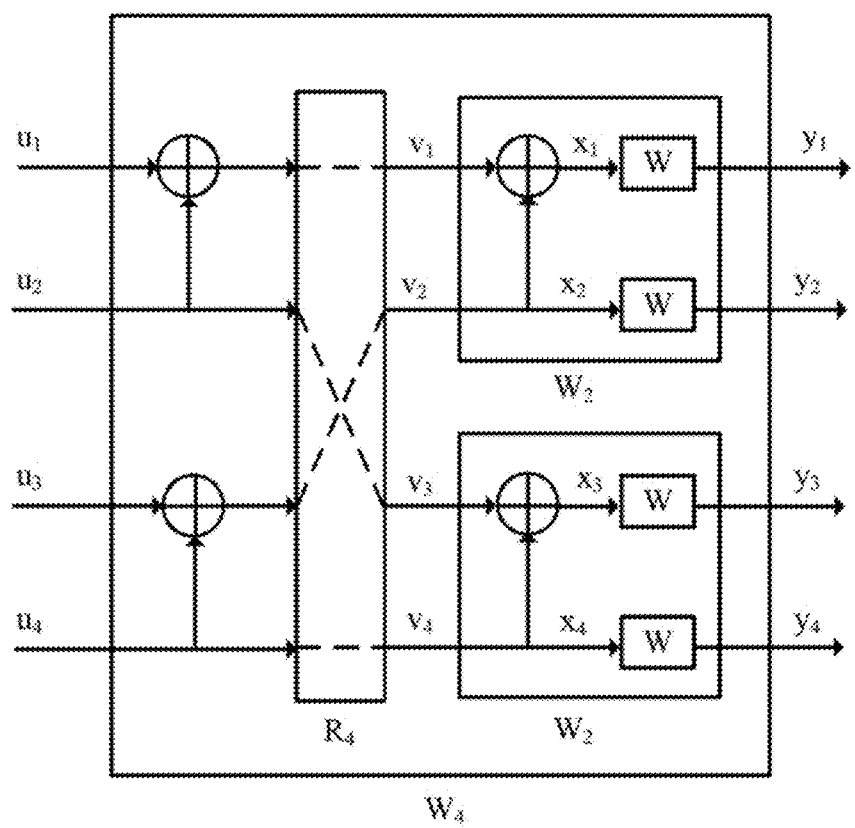
FIG. 3 is a schematic block diagram of a structure of a polar code encoder according to an embodiment of the present invention.

FIG. 3 shows a schematic block diagram of a structure of a polar code encoder according to an embodiment of the present invention. As shown in FIG. 3, $u_i$ represents the $i^{th}$ input bit of the polar code encoder, $v_i$ represents the $i^{th}$ bit obtained after first-level adding operation and permutation operation, $x_i$ represents the $i^{th}$ bit obtained after second-level adding operation, and $y_i$ represents the $i^{th}$ output bit of the polar code encoder. W represents a fundamental channel, $W_2$ represents a compound channel whose size is 2, $W_4$ represents a compound channel whose size is 4, and $R_4$ represents a butterfly permutation unit whose size is 4.

It should be noted that, FIG. 3 shows merely a typical structure of the polar code encoder of this embodiment of the present invention; however, the present invention is not limited thereto.

FIG. 4 shows a schematic flowchart of a method for transmitting information according to an embodiment of the present invention. The method shown in FIG. 4 may be executed by a communications device. As shown in FIG. 4, a method 1000 includes the following steps:

S1100. Determine a quantity N of padding bits according to a quantity M of effective information bits included in a code block and a quantity L of effective input ports of a polar code encoder, where M and L are positive integers, and N is a difference between L and M.

S1200. Determine input bits that are to be input into the polar code encoder, where the input bits include the M effective information bits and the N padding bits.

S1300. Input, according to a mapping relationship between the L effective input ports and the input bits, the input bits into the polar code encoder through the L effective input ports to perform coding, so as to obtain coded bits.

S1400. Transmit the Coded Bits.

Specifically, the communications device determines, according to the quantity M of the effective information bits included in the code block and the quantity L of the effective input ports of the polar code encoder, that the quantity N of padding bits is the difference between L and M. The communications device determines that the input bits to be input into the polar code encoder include the M effective information bits and the N padding bits; inputs, according to the mapping relationship between the L effective input ports and the input bits, the input bits into the polar code encoder through the L effective input ports to perform coding, so as to obtain the coded bits; and transmits the coded bits.

Therefore, in the method for transmitting information in this embodiment of the present invention, a communications device determines a quantity N of padding bits according to a quantity M of effective information bits included in a code block and a quantity L of effective input ports of a polar code encoder; determines that input bits to be input into the polar code encoder include the M effective information bits and the N padding bits; inputs, according to a mapping relationship between the effective input ports and the input bits, the input bits into the polar code encoder to perform coding, so as to obtain coded bits; and transmits the coded bits. In this way, when the quantity of the effective information bits included in the code block is less than the quantity of the effective input ports of the polar code encoder, coding is successfully performed in a bit-padding manner by using polar code, thereby completing transmission of the effective information bits.

It should be understood that, in this embodiment of the present invention, when a data block that needs to be transmitted is relatively large, effective information bits corresponding to the data block may be segmented for coding. A quantity of effective information bits corresponding to each code block is less than or equal to the quantity of effective input ports of the polar code encoder. The data block may be chunked in a code block segmentation manner in the prior art, or may be chunked in another manner, and the present invention is not limited thereto.

In this embodiment of the present invention, optionally, the mapping relationship may be independently determined by the communications device, or may be determined by another communications device (for example, a base station) and then sent to the communications device, and the present invention is not limited thereto.

In this embodiment of the present invention, optionally, the communications device may re-determine the mapping relationship according to a specific rule each time before coding, or the communications device may pre-store one or more mapping relationships and select a corresponding mapping relationship for use by searching a table or in another possible manner each time before coding, and the present invention is not limited thereto.

It should be further understood that, in this embodiment of the present invention, although the padding bits are coded and transmitted, the padding bits do not include useful information and are useless even if the padding bits are decoded. Therefore, in practice, a decoding error of the padding bits does not affect coding performance of the system.

In this embodiment of the present invention, optionally, a value of a padding bit may be set to "0" or another value, and the value of the padding bit may be independently set by each manufacturer. The present invention is not limited thereto.

Optionally, in S1300, the mapping relationship between the L effective input ports and the input bits may be a random correspondence, that is, in S1300, the N padding bits may be input into the polar code encoder by using any N effective input ports in the effective input ports of the polar code encoder. The present invention is not limited thereto.

In this embodiment of the present invention, optionally, the mapping relationship may be determined according to a rule that quality of compound channels corresponding to effective input ports that are used to transmit the M effective information bits is better than quality of compound channels corresponding to effective input ports that are used to transmit the N padding bits.

In this embodiment of the present invention, optionally, the mapping relationship is that a first group of effective input ports are used to transmit the M effective information bits and a second group of effective input ports are used to transmit the N padding bits.

The first group of effective input ports and the second group of effective input ports are determined according to quality of a compound channel corresponding to an effective input port in the L effective input ports, and quality of a compound channel corresponding to an effective input port in the first group of effective input ports is better than quality of a compound channel corresponding to an effective input port in the second group of effective input ports.

Specifically, it is assumed that the polar code encoder has five effective input ports, serial numbers corresponding to the input ports are respectively $U_7$, $U_9$, $U_{10}$, $U_{15}$, and $U_{16}$, and quality of compound channels corresponding to the ports $U_7$, $U_{15}$, and $U_{16}$ is better than that of compound channels corresponding to the ports $U_9$ and $U_{10}$. Therefore, the five effective input ports are classified into two groups: a first group of effective input ports include the ports $U_7$, $U_{15}$, and $U_{16}$ for transmitting three effective information bits, and a second group of effective input ports include two ports $U_9$ and $U_{10}$ for transmitting two padding bits. In an input process, the three effective information bits may be first input. According to an input sequence, the three effective information bits may respectively correspond to the ports $U_7$, $U_{15}$, and $U_{16}$, or may respectively correspond to $U_{15}$, $U_7$, and $U_{16}$, or may have another mapping relationship. After all of the three effective information bits are input, the two padding bits are input. According to an input sequence, the two padding bits may respectively correspond to the ports $U_9$ and $U_{10}$ or $U_{10}$ and $U_9$. Alternatively, the two padding bits may be first input, and the three effective information bits are input later, and the present invention is not limited thereto.

Preferably, each port in the first group of effective input ports may be sorted according to quality of a corresponding compound channel, for example, may be sorted according to a descending order of the quality of the compound channels to obtain a first effective input port sequence. Subsequently, a mapping relationship between an effective input port in the first effective input port sequence and an effective information bit in the M effective information bits is as follows: The $i^{th}$ effective input port in the first effective input port sequence is used to transmit the $i^{th}$ effective information bit that is to be input into the polar code encoder in the M effective information bits, and i is 1, 2, 3 . . . or M.

Specifically, that the first group of effective input ports includes the ports $U_7$, $U_{15}$, and $U_{16}$ is used as an example. It is assumed that quality of a compound channel corresponding to the port $U_{16}$ is better than quality of a compound channel corresponding to the port $U_7$ and the quality of the compound channel corresponding to the port $U_7$ is better than quality of a compound channel corresponding to the port $U_{15}$, the three effective input ports are sorted into a descending sequence of $U_{16}$, $U_7$, and $U_{15}$ according to a descending order of quality of the corresponding compound channels. In this case, a mapping relationship between the effective input ports and three effective information bits may be as follows: The port $U_{16}$ is used to transmit the first effective information bit that is to be input into the polar code encoder, the port $U_7$ is used to transmit the second effective information bit that is to be input into the polar code encoder, and the port $U_{15}$ is used to transmit the third effective information bit that is to be input into the polar code encoder.

In this embodiment of the present invention, optionally, the mapping relationship is determined according to a result of sorting the L effective input ports according to quality of corresponding compound channels.

Specifically, the L effective input ports may be sorted according to a descending order of quality of compound channels corresponding to the effective input ports, the L effective input ports may be sorted according to an ascending order of quality of compound channels corresponding to the effective input ports, or the L effective input ports may be sorted according to another sorting rule, and the present invention is not limited thereto.

In this embodiment of the present invention, optionally, the mapping relationship is that M effective input ports whose compound channels have best quality in an effective input port sequence are used to transmit the M effective information bits in the input bits. The effective input port sequence is generated by sorting the L effective input ports according to the quality of the corresponding compound channels.

Specifically, the effective input port sequence is generated by sorting the L effective input ports according to a descending order of the quality of the corresponding compound channels, and a mapping relationship between the effective input ports in the effective input port sequence and the input bits is as follows: The first to the $M^{th}$ effective input ports in the effective input port sequence are used to transmit the M effective information bits in the input bits.

Alternatively, the effective input port sequence is generated by sorting the L effective input ports according to an ascending order of the quality of the corresponding compound channels, and a mapping relationship between the effective input ports in the effective input port sequence and the input bits is as follows: The $(n+1)^{th}$ to the $L^{th}$ effective input ports in the effective input port sequence are used to transmit the M effective information bits in the input bits.

Specifically, it is assumed that three effective information bits need to be transmitted, the polar code encoder has five effective input ports, serial numbers corresponding to the input ports are respectively $U_7$, $U_9$, $U_{10}$, $U_{15}$, and $U_{16}$, and sorting is performed according to a descending order of quality of corresponding compound channels. An obtained effective input port sequence is $U_7$, $U_{15}$, $U_{16}$, $U_9$, and $U_{10}$. Therefore, the ports $U_7$, $U_{15}$, and $U_{16}$ may be used to transmit the three effective information bits, and the three effective information bits may respectively correspond to the ports $U_7$, $U_{15}$, and $U_{16}$, may respectively correspond to $U_{15}$, $U_7$, and $U_{16}$, or may have another mapping relationship according to an input sequence. The other ports may be used to transmit two padding bits, and a mapping relationship between the padding bits and the remaining ports is not limited in the present invention.

If sorting is performed according to an ascending order of the quality of the corresponding compound channels, an obtained effective input port sequence is: $U_{10}$, $U_9$, $U_{16}$, $U_{15}$, and $U_7$. Therefore, the ports $U_7$, $U_{15}$, and $U_{16}$ may be used to transmit the three effective information bits, and the three effective information bits may respectively correspond to the ports $U_7$, $U_{15}$, and $U_{16}$, may respectively correspond to $U_{15}$, $U_7$, and $U_{16}$, or may have another mapping relationship according to an input sequence. The other ports may be used to transmit two padding bits, and a mapping relationship between the padding bits and the remaining ports is not limited in the present invention.

Therefore, in the method for transmitting information in this embodiment of the present invention, a communications device determines a quantity N of padding bits according to a quantity M of effective information bits included in a code block and a quantity L of effective input ports of a polar code encoder; determines that input bits include the M effective information bits and the N padding bits; inputs, according to a mapping relationship between the effective input ports and the input bits, the input bits into the polar code encoder to perform coding, so as to obtain coded bits; and transmits the coded bits. In this way, when the quantity of the effective information bits included in the code block is less than the quantity of the effective input ports of the polar code encoder, bit padding can be performed. In addition, by using the mapping relationship between the effective input ports and the input bits, the padding bits can be transmitted by using ports whose compound channels have poorer quality, and the effective information bits can be transmitted by using ports whose compound channels have better quality. As a result, relatively good coding performance can be obtained by fully utilizing performance of polar code, thereby improving quality of information transmission.

In this embodiment of the present invention, optionally, the effective input ports may be sorted according to another condition, and then a mapping relationship between an effective input port and an effective input bit or a padding bit is determined, and the present invention is not limited thereto.

In this embodiment of the present invention, optionally, the quality of the compound channel corresponding to an effective input port in the L effective input ports is represented by at least one of the following parameters: a channel capacity, channel confidence, a bit error rate, and a block error rate. That is, the quality of the compound channel corresponding to the effective input port may be determined by calculating a value of one parameter of the channel capacity, the channel confidence, the bit error rate, and the block error rate; or the quality of the compound channel corresponding to the effective input port may be determined by calculating a value of a weighted combination of several parameters in these parameters. However, the present invention is not limited thereto.

Figure 5:
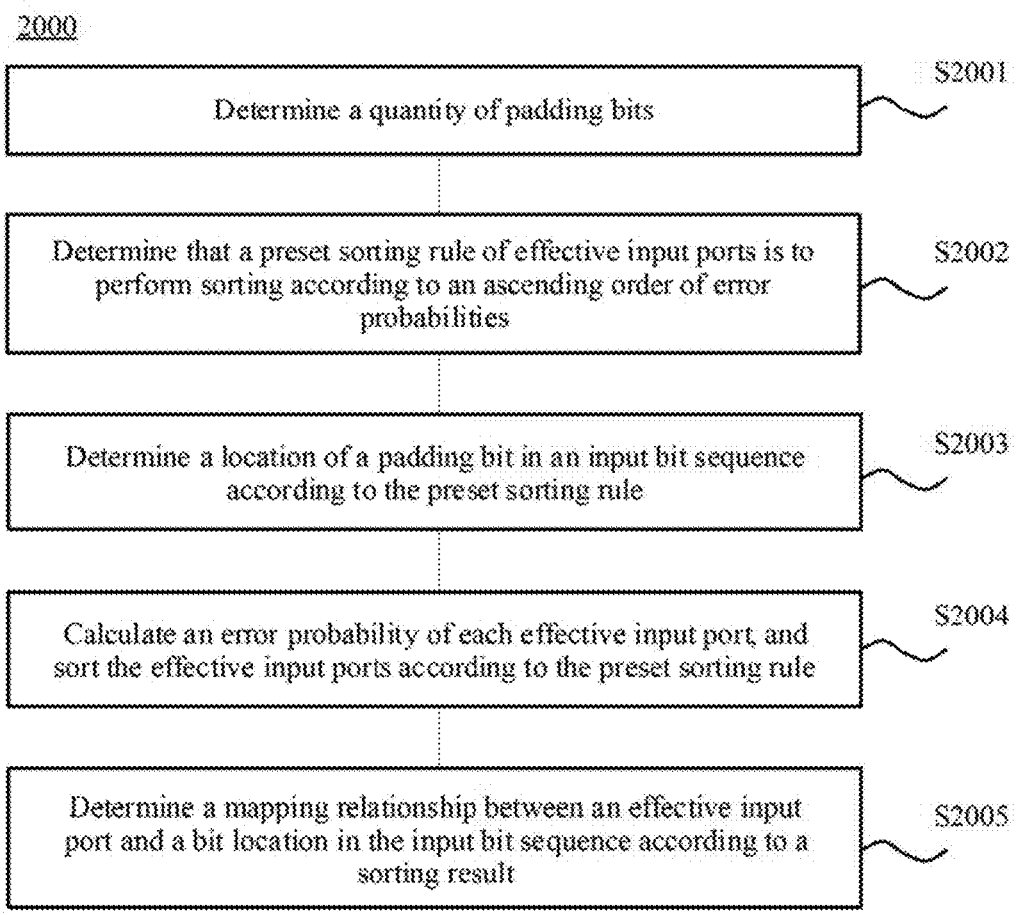
FIG. 5 is a schematic flowchart of a method for transmitting information according to another embodiment of the present invention.

FIG. 5 is a schematic flowchart of a method for transmitting information according to another embodiment of the present invention. As shown in FIG. 5, a method 2000 includes the following steps.

S2001. Determine a Quantity of Padding Bits.

Figure 6:
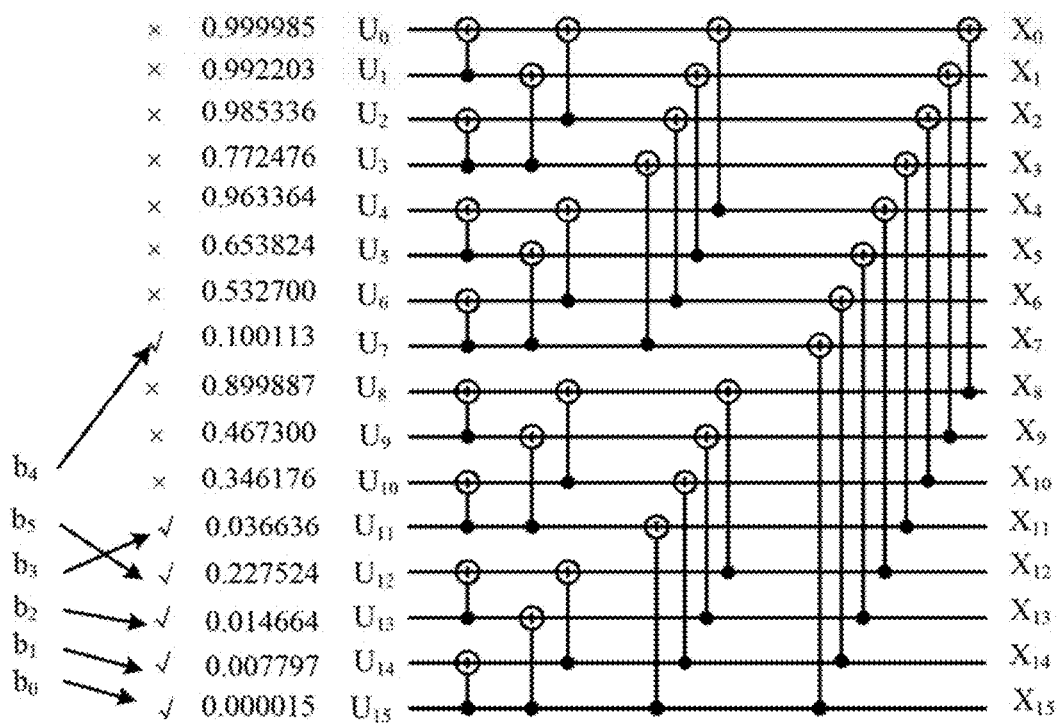
FIG. 6 is a schematic diagram of an input port sequence of a polar code encoder according to an embodiment of the present invention.

Specifically, it is assumed that a quantity of to-be-transmitted effective information bits is four, and a polar code encoder shown in FIG. 6 has 16 input ports, which are classified into six effective bit input ports (ports marked with ticks in the figure) and ten frozen bit input ports (ports marked with crosses in the figure). In this case, the quantity of padding bits is two. The ten frozen bit input ports directly input bits (for example, all zeroes) known to a receive end, and this may be implemented by using an internal structure of hardware. Port serial numbers corresponding to the six effective input ports are respectively $U_7$, $U_{11}$, $U_{12}$, $U_{13}$, $U_{14}$, and $U_{15}$.

S2002. Determine that a preset sorting rule of effective input ports is to perform sorting according to an ascending order of error probabilities.

S2003. Determine a location of a padding bit in an input bit sequence according to the preset sorting rule.

Specifically, it is assumed that bit locations in the input bit sequence are respectively referred to as locations $b_0$, $b_1$, $b_2$, $b_3$, $b_4$, and $b_5$ from beginning to end. In this case, the two padding bits correspond to the locations $b_4$ and $b_5$ in the input bit sequence.

S2004. Calculate an error probability of an effective input port, and sort the effective input ports according to the preset sorting rule.

Specifically, the error probabilities of the six effective input ports in S2001 are respectively $U_7$: 0.100113, $U_{11}$: 0.036636, $U_{12}$: 0.227524, $U_{13}$: 0.014664, $U_{14}$: 0.007797, and $U_{15}$: 0.000015, and according to the ascending order of the error probabilities, the effective input ports each are sorted as follows: $U_{15}$, $U_{14}$, $U_{13}$, $U_{11}$, $U_7$, and $U_{12}$.

S2005. Determine a mapping relationship between an effective input port and a bit location in the input bit sequence according to a sorting result.

Specifically, determined mapping relationships are that the ports $U_{15}$, $U_{14}$, $U_{13}$, $U_{11}$, $U_7$, and $U_{12}$ respectively correspond to the locations $b_0$, $b_1$, $b_2$, $b_3$, $b_4$, and $b_5$.

That is, the first to the sixth information bits to be input into the polar code encoder are input into the polar code encoder respectively by using the ports $U_{15}$, $U_{14}$, $U_{13}$, $U_{11}$, $U_7$, and $U_{12}$.

Optionally, in S2005, the ports $U_{15}$, $U_{14}$, $U_{13}$, and $U_{11}$ may respectively correspond to the locations $b_0$, $b_1$, $b_2$, and $b_3$, and the location $b_4$ corresponds to $U_7$ or $U_{12}$. Correspondingly, the location $b_5$ corresponds to $U_{12}$ or $U_7$.

Therefore, in the method for transmitting information in this embodiment of the present invention, a quantity N of padding bits is determined according to a quantity M of effective information bits included in a code block and a quantity L of effective input ports of a polar code encoder; input bits include the M effective information bits and the N padding bits; the input bits are input, according to a mapping relationship between the effective input ports and the input bits, into the polar code encoder to perform coding, so as to obtain coded bits; and the coded bits are transmitted. In this way, when the quantity of the effective information bits included in the code block is less than the quantity of the effective input ports of the polar code encoder, bit padding can be performed. In addition, by using the mapping relationship between the effective input ports and the input bits, the padding bits can be transmitted by using ports whose compound channels have poorer quality, and the effective information bits can be transmitted by using ports whose compound channels have better quality. As a result, relatively good coding performance can be obtained by fully utilizing performance of polar code, thereby improving quality of information transmission.

In the above, the method for transmitting information in the embodiments of the present invention is described in detail with reference to FIG. 4 to FIG. 6, and in the following, a communications device for transmitting information in the embodiments of the present invention is described in detail with reference to FIG. 7 to FIG. 8.

Figure 7:
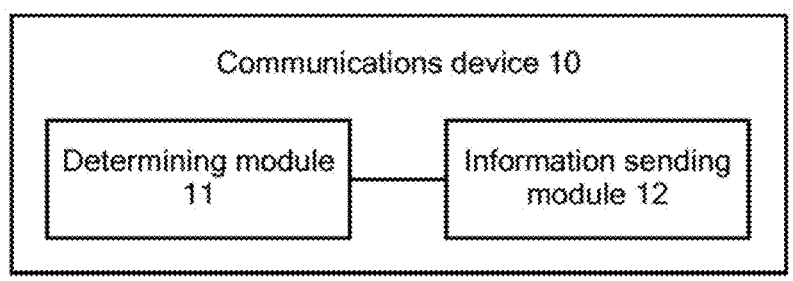
FIG. 7 is a schematic block diagram of a communications device according to an embodiment of the present invention.

FIG. 7 shows a communications device for transmitting information according to an embodiment of the present invention. As shown in FIG. 7, a communications device 10 includes:

a determining module 11, configured to determine a quantity N of padding bits according to a quantity M of effective information bits included in a code block and a quantity L of effective input ports of a polar code encoder, where M and L are positive integers, and N is a difference between L and M; where the determining module 11 is further configured to determine input bits that are to be input into the polar code encoder, where the input bits include the M effective information bits and the N padding bits; and an information sending module 12, configured to input, according to a mapping relationship between the L effective input ports and the input bits, the input bits into the polar code encoder through the L effective input ports to perform coding, so as to obtain coded bits; where the information sending module 12 is further configured to transmit the coded bits.

Specifically, the communications device determines, according to the quantity M of the effective information bits included in the code block and the quantity L of the effective input ports of the polar code encoder, that the quantity N of padding bits is the difference between L and M. The communications device determines that the input bits to be input into the polar code encoder include the M effective information bits and the N padding bits; inputs, according to the mapping relationship between the L effective input ports and the input bits, the input bits into the polar code encoder through the L effective input ports to perform coding, so as to obtain the coded bits; and transmits the coded bits.

Therefore, the communications device for transmitting information in this embodiment of the present invention determines a quantity N of padding bits according to a quantity M of effective information bits included in a code block and a quantity L of effective input ports of a polar code encoder; determines that input bits to be input into the polar code encoder include the M effective information bits and the N padding bits; and inputs, according to a mapping relationship between the effective input ports and the input bits, the input bits into the polar code encoder to perform coding, so as to obtain coded bits. In this way, when the quantity of the effective information bits included in the code block is less than the quantity of the effective input ports of the polar code encoder, coding is successfully performed in a bit-padding manner by using polar code, thereby completing transmission of the effective information bits.

In this embodiment of the present invention, optionally, the communications device may be a base station, user equipment, or a WLAN device; however, the present invention is not limited thereto.

In this embodiment of the present invention, optionally, the mapping relationship is determined according to a rule that quality of compound channels corresponding to effective input ports that are used to transmit the M effective information bits is better than quality of compound channels corresponding to effective input ports that are used to transmit the N padding bits.

In this embodiment of the present invention, optionally, the mapping relationship is that a first group of effective input ports are used to transmit the M effective information bits and a second group of effective input ports are used to transmit the N padding bits.

The first group of effective input ports and the second group of effective input ports are determined according to quality of a compound channel corresponding to an effective input port in the L effective input ports, and quality of a compound channel corresponding to an effective input port in the first group of effective input ports is better than quality of a compound channel corresponding to an effective input port in the second group of effective input ports.

In this embodiment of the present invention, optionally, the mapping relationship is determined according to a result of sorting the L effective input ports according to quality of corresponding compound channels.

In this embodiment of the present invention, optionally, the mapping relationship is that M effective input ports whose compound channels have best quality in an effective input port sequence are used to transmit the M effective information bits in the input bits. The effective input port sequence is generated by sorting the L effective input ports according to the quality of the corresponding compound channels.

In this embodiment of the present invention, optionally, the quality of the compound channel corresponding to an effective input port in the L effective input ports is represented by at least one of the following parameters: a channel capacity, channel confidence, a bit error rate, and a block error rate.

It should be understood that the communications device 10 according to this embodiment of the present invention may correspondingly execute the method 1000 for transmitting information in the embodiment of the present invention, and the foregoing and other operations and/or functions of the modules of the communications device 10 are used to implement corresponding procedures in FIG. 4. For brevity, details are not described herein.

Therefore, the communications device for transmitting information in this embodiment of the present invention determines a quantity N of padding bits according to a quantity M of effective information bits included in a code block and a quantity L of effective input ports of a polar code encoder; determines that input bits include the M effective information bits and the N padding bits; inputs, according to a mapping relationship between the effective input ports and the input bits, the input bits into the polar code encoder to perform coding, so as to obtain coded bits; and transmits the coded bits. In this way, when the quantity of the effective information bits included in the code block is less than the quantity of the effective input ports of the polar code encoder, bit padding can be performed. In addition, by using the mapping relationship between the effective input ports and the input bits, the padding bits can be transmitted by using ports whose compound channels have poorer quality, and the effective information bits can be transmitted by using ports whose compound channels have better quality. As a result, relatively good coding performance can be obtained by fully utilizing performance of polar code, thereby improving quality of information transmission.

Figure 8:
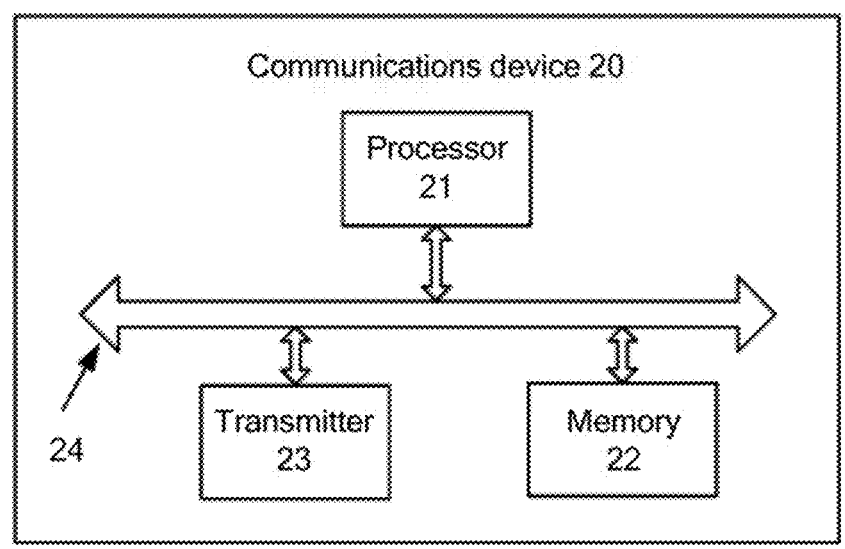
FIG. 8 is a schematic block diagram of a communications device according to another embodiment of the present invention.

As shown in FIG. 8, an embodiment of the present invention further provides a communications device 20, and the communications device 20 includes a processor 21, a memory 22, a transmitter 23, and a bus system 24. The processor 21, the memory 22, and the transmitter 23 are connected by using the bus system 24, the memory 22 is configured to store an instruction, and the processor 21 is configured to execute the instruction stored in the memory 22, so as to control the transmitter 23 to transmit a signal. The processor 21 is configured to determine a quantity N of padding bits according to a quantity M of effective information bits included in a code block and a quantity L of effective input ports of a polar code encoder, where M and L are positive integers, and N is a difference between L and M. The processor 21 is further configured to determine input bits that are to be input into the polar code encoder, and the input bits include the M effective information bits and the N padding bits. The transmitter 23 is configured to input, according to a mapping relationship between the L effective input ports and the input bits, the input bits into the polar code encoder through the L effective input ports to perform coding, so as to obtain coded bits; and the transmitter 23 is further configured to transmit the coded bits.

Therefore, the communications device for transmitting information in this embodiment of the present invention determines a quantity N of padding bits according to a quantity M of effective information bits included in a code block and a quantity L of effective input ports of a polar code encoder; determines that input bits to be input into the polar code encoder include the M effective information bits and the N padding bits; inputs, according to a mapping relationship between the effective input ports and the input bits, the input bits into the polar code encoder to perform coding, so as to obtain coded bits; and transmits the coded bits. In this way, when the quantity of the effective information bits included in the code block is less than the quantity of the effective input ports of the polar code encoder, coding is successfully performed in a bit-padding manner by using polar code, thereby completing transmission of the effective information bits.

It should be understood that, in this embodiment of the present invention, the processor 21 may be a central processing unit (CPU), or the processor 21 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor or the processor may be any conventional processor, or the like.

The memory 22 may include a read-only memory and a random access memory, and provide an instruction and data for the processor 21. A part of the memory 22 may further include a nonvolatile random access memory. For example, the memory 22 may further store information about a device type.

In addition to a data bus, the bus system 24 may include a power bus, a control bus, a status signal bus, and the like. However, for clarity of description, various buses are marked as the bus system 24 in the figure.

In an implementation process, the steps in the foregoing method may be completed by using an integrated logic circuit of hardware in the processor 21 or an instruction in a form of software. The steps of the method disclosed with reference to the embodiments of the present invention may be directly executed and completed by a hardware processor, or may be executed and completed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory 22. The processor 21 reads information in the memory 22, and completes the steps of the foregoing method in combination with hardware of the processor 21. To avoid repetition, details are not described herein.

Optionally, in an embodiment, the mapping relationship is determined according to a rule that quality of compound channels corresponding to effective input ports that are used to transmit the M effective information bits is better than quality of compound channels corresponding to effective input ports that are used to transmit the N padding bits.

Optionally, in an embodiment, the mapping relationship is that a first group of effective input ports are used to transmit the M effective information bits and a second group of effective input ports are used to transmit the N padding bits.

The first group of effective input ports and the second group of effective input ports are determined according to quality of a compound channel corresponding to an effective input port in the L effective input ports, and quality of a compound channel corresponding to an effective input port in the first group of effective input ports is better than quality of a compound channel corresponding to an effective input port in the second group of effective input ports.

Optionally, in an embodiment, the mapping relationship is determined according to a result of sorting the L effective input ports according to quality of corresponding compound channels.

Optionally, in an embodiment, the mapping relationship is that M effective input ports whose compound channels have best quality in an effective input port sequence are used to transmit the M effective information bits in the input bits. The effective input port sequence is generated by sorting the L effective input ports according to the quality of the corresponding compound channels.

Optionally, in an embodiment, the quality of the compound channel corresponding to an effective input port in the L effective input ports is represented by at least one of the following parameters: a channel capacity, channel confidence, a bit error rate, and a block error rate.

It may be understood that the communications device 20 in this embodiment of the present invention may correspond to the communications device 10 in the embodiment of the present invention, or may correspond to a corresponding entity that executes the method in the embodiments of the present invention, and the foregoing and other operations and/or functions of the modules of the communications device 20 are used to implement corresponding procedures of the method in FIG. 4. For brevity, details are not described herein.

Therefore, the communications device for transmitting information in this embodiment of the present invention determines a quantity N of padding bits according to a quantity M of effective information bits included in a code block and a quantity L of effective input ports of a polar code encoder; determines that input bits include the M effective information bits and the N padding bits; inputs, according to a mapping relationship between the effective input ports and the input bits, the input bits into the polar code encoder to perform coding, so as to obtain coded bits; and transmits the coded bits. In this way, when the quantity of the effective information bits included in the code block is less than the quantity of the effective input ports of the polar code encoder, bit padding can be performed. In addition, by using the mapping relationship between the effective input ports and the input bits, the padding bits can be transmitted by using ports whose compound channels have poorer quality, and the effective information bits can be transmitted by using ports whose compound channels have better quality. As a result, relatively good coding performance can be obtained by fully utilizing performance of polar code, thereby improving quality of information transmission.

It should be understood that "an embodiment" mentioned throughout this specification means that a specific characteristic, a structure, or a feature related to the embodiments is included in at least one embodiment of the present invention. Therefore, "in an embodiment" that appears throughout the specification does not necessarily indicate a same embodiment. In addition, the specific characteristic, structure, or feature may be combined in any appropriate manner in one or more embodiments.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining B according to A does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting information, comprising:
   determining a quantity N of padding bits according to a quantity M of effective information bits comprised in a code block and a quantity L of effective input ports of a polar code encoder, wherein M and L are positive integers, and N is a difference between L and M;
   determining input bits that are to be input into the polar code encoder, wherein the input bits comprise the M effective information bits and the N padding bits;
   inputting, according to a mapping relationship between the L effective input ports and the input bits, the input bits into the polar code encoder through the L effective input ports to perform coding, so as to obtain coded bits; and
   transmitting the coded bits.

2. The method according to claim 1, wherein the mapping relationship is determined according to a rule that quality of compound channels corresponding to effective input ports that are used to transmit the M effective information bits is better than quality of compound channels corresponding to effective input ports that are used to transmit the N padding bits.

3. The method according to claim 1, wherein the mapping relationship is that a first group of effective input ports are used to transmit the M effective information bits and a second group of effective input ports are used to transmit the N padding bits; and
   the first group of effective input ports and the second group of effective input ports are determined according to quality of a compound channel corresponding to an effective input port in the L effective input ports, and quality of a compound channel corresponding to an effective input port in the first group of effective input ports is better than quality of a compound channel corresponding to an effective input port in the second group of effective input ports.

4. The method according to claim 1, wherein the mapping relationship is determined according to a result of sorting the L effective input ports according to quality of corresponding compound channels.

5. The method according to claim 4, wherein the mapping relationship is that M effective input ports whose compound channels have best quality in an effective input port sequence are used to transmit the M effective information bits in the input bits, wherein the effective input port sequence is generated by sorting the L effective input ports according to the quality of the corresponding compound channels.

6. The method according to claim 5, wherein the quality of the compound channel corresponding to an effective input port in the L effective input ports is represented by at least one of the following parameters: a channel capacity, channel confidence, a bit error rate, and a block error rate.

7. A communications device for transmitting information, comprising:
   a memory to store instructions; and
   a processor to execute the instructions to cause the communications device to:
   determine a quantity N of padding bits according to a quantity M of effective information bits comprised in a code block and a quantity L of effective input ports of a polar code encoder, wherein M and L are positive integers, and N is a difference between L and M;
   determine input bits that are to be input into the polar code encoder, wherein the input bits comprise the M effective information bits and the N padding bits;
   input, according to a mapping relationship between the L effective input ports and the input bits, the input bits into the polar code encoder through the L effective input ports to perform coding, so as to obtain coded bits; and
   transmit the coded bits.

8. The communications device according to claim 7, wherein the mapping relationship is determined according to a rule that quality of compound channels corresponding to effective input ports that are used to transmit the M effective information bits is better than quality of compound channels corresponding to effective input ports that are used to transmit the N padding bits.

9. The communications device according to claim 7, wherein the mapping relationship is that a first group of effective input ports are used to transmit the M effective information bits and a second group of effective input ports are used to transmit the N padding bits; and the first group of effective input ports and the second group of effective input ports are determined according to quality of a compound channel corresponding to an effective input port in the L effective input ports, and quality of a compound channel corresponding to an effective input port in the first group of effective input ports is better than quality of a compound channel corresponding to an effective input port in the second group of effective input ports.

10. The communications device according to claim 7, wherein the mapping relationship is determined according to a result of sorting the L effective input ports according to quality of corresponding compound channels.

11. The communications device according to claim 10, wherein the mapping relationship is that M effective input ports whose compound channels have best quality in an effective input port sequence are used to transmit the M effective information bits in the input bits, wherein the effective input port sequence is generated by sorting the L effective input ports according to the quality of the corresponding compound channels.

12. The communications device according to claim 11, wherein the quality of the compound channel corresponding to an effective input port in the L effective input ports is represented by at least one of the following parameters: a channel capacity, channel confidence, a bit error rate, and a block error rate.

13. A communications device for transmitting information, comprising:

a processor, a transmitter, and a memory storage accessible to the processor, wherein the processor is configured to determine a quantity N of padding bits according to a quantity M of effective information bits comprised in a code block and a quantity L of effective input ports of a polar code encoder, wherein M and L are positive integers, and N is a difference between L and M; and determine input bits that are to be input into the polar code encoder, wherein the input bits comprise the M effective information bits and the N padding bits; and the transmitter is configured to input, according to a mapping relationship between the L effective input ports and the input bits, the input bits into the polar code encoder through the L effective input ports to perform coding, so as to obtain coded bits; and transmit the coded bits.

14. The communications device according to claim 13, wherein the mapping relationship is determined according to a rule that quality of compound channels corresponding to effective input ports that are used to transmit the M effective information bits is better than quality of compound channels corresponding to effective input ports that are used to transmit the N padding bits.

15. The communications device according to claim 13, wherein the mapping relationship is that a first group of effective input ports are used to transmit the M effective information bits and a second group of effective input ports are used to transmit the N padding bits; and the first group of effective input ports and the second group of effective input ports are determined according to quality of a compound channel corresponding to an effective input port in the L effective input ports, and quality of a compound channel corresponding to an effective input port in the first group of effective input ports is better than quality of a compound channel corresponding to an effective input port in the second group of effective input ports.

16. The communications device according to claim 13, wherein the mapping relationship is determined according to a result of sorting the L effective input ports according to quality of corresponding compound channels.

17. The communications device according to claim 16, wherein the mapping relationship is that M effective input ports whose compound channels have best quality in an effective input port sequence are used to transmit the M effective information bits in the input bits, wherein the effective input port sequence is generated by sorting the L effective input ports according to the quality of the corresponding compound channels.

18. The communications device according to claim 17, wherein the quality of the compound channel corresponding to an effective input port in the L effective input ports is represented by at least one of the following parameters: a channel capacity, channel confidence, a bit error rate, and a block error rate.

* * * * *

UNITED STATES PATENT AND TRADEMARK OFFICE
CERTIFICATE OF CORRECTION

PATENT NO. : 10,419,161 B2
APPLICATION NO. : 15/699192
DATED : September 17, 2019
INVENTOR(S) : Rong et al.

It is certified that error appears in the above-identified patent and that said Letters Patent is hereby corrected as shown below:

In the Specification

In Column 3, Line 13, delete "relaitionship" and insert -- relationship --, therefor.

Signed and Sealed this
Sixth Day of September, 2022

Katherine Kelly Vidal
*Director of the United States Patent and Trademark Office*